US008033670B2

(12) United States Patent
Costigan et al.

(10) Patent No.: US 8,033,670 B2
(45) Date of Patent: Oct. 11, 2011

(54) MANUALLY ADJUSTABLE RUGGEDIZED FOCUS MECHANISM

(75) Inventors: George Costigan, Westford, MA (US); Steven N. Goodspeed, Westford, MA (US); Robert J. Tremblay, Framingham, MA (US); John F. Keating, Medway, MA (US); Brian S. Phillips, Sherborn, MA (US); James Hoffmaster, Dedham, MA (US)

(73) Assignee: Cognex Corporation, Natick, MA (US)

( * ) Notice: Subject to any disclaimer, the term of this patent is extended or adjusted under 35 U.S.C. 154(b) by 977 days.

(21) Appl. No.: 11/618,132

(22) Filed: Dec. 29, 2006

(65) Prior Publication Data

US 2008/0158678 A1 Jul. 3, 2008

(51) Int. Cl.
*G02B 23/16* (2006.01)
*G02B 7/02* (2006.01)
*G02B 7/04* (2006.01)
*G02B 13/16* (2006.01)

(52) U.S. Cl. ........ 359/507; 359/513; 359/825; 359/829; 359/830; 359/900; 348/294; 348/345; 250/216

(58) Field of Classification Search .................. 359/507, 359/508, 513, 825, 829, 830, 894, 900, 813; 348/294, 335, 345; 250/216; 358/823
See application file for complete search history.

(56) References Cited

U.S. PATENT DOCUMENTS

| | | | |
|---|---|---|---|
| 3,581,595 A | 6/1971 | Carlson | |
| 3,947,860 A | 3/1976 | Imai et al. | |
| 4,072,396 A | 2/1978 | Ross | |
| 4,160,590 A | 7/1979 | Reynard | |
| 4,478,491 A | 10/1984 | Kawai | |
| 4,490,018 A | 12/1984 | Yokotsuka | |
| 4,494,828 A | 1/1985 | Masumoto et al. | |
| 4,591,253 A | 5/1986 | Hecker et al. | |
| 4,722,000 A * | 1/1988 | Chatenever | 348/75 |
| 4,732,438 A * | 3/1988 | Orbach et al. | 348/341 |
| 4,807,594 A * | 2/1989 | Chatenever | 600/112 |
| 4,969,450 A * | 11/1990 | Chinnock et al. | 600/109 |

(Continued)

OTHER PUBLICATIONS

GEO PresencePlus P4 User's Manual, Banner Engineering Corp., P/N. 121555, Mar. 2005.

(Continued)

*Primary Examiner* — Ricky D Shafer
(74) *Attorney, Agent, or Firm* — David J. Pownser

(57) ABSTRACT

The invention provides, in some aspects, devices for image acquisition that use seals (e.g., O-rings) between concentrically disposed portions of an enclosure and an optics assembly (or sub-assemblies thereof) in order to protect image acquisition components from the surrounding environment (and vice versa) while, at the same time, providing adequate friction for both adjusting and locking focus. Such devices include, in one aspect of the invention, an image capture medium (e.g., a CMOS sensor, CCD array, etc.) that is disposed within an enclosure and an optics assembly that is also disposed within that enclosure, rotatably. The optics assembly, which includes at least a lens, can have a cylindrical outer diameter along at least a portion of its length that is received within the enclosure along a length that has a corresponding cylindrical inner diameter. A first seal (e.g., an "O-ring") is disposed between, and in contact with, the optics assembly and the enclosure, e.g., along these corresponding lengths. That seal permits rotation of the optics assembly for purposes of focusing the lens, while preventing (or reducing a risk of) contamination from the environment (e.g., water, chemicals, dirt, dust, etc.) from entering into the enclosure and vice versa.

24 Claims, 3 Drawing Sheets

U.S. PATENT DOCUMENTS

| | | | |
|---|---|---|---|
| 5,005,038 A | 4/1991 | Ogawa et al. | |
| 5,092,670 A | 3/1992 | Preston | |
| 5,247,152 A | 9/1993 | Swartz et al. | |
| 5,349,172 A | 9/1994 | Roustaei | |
| RE34,989 E | 7/1995 | Struhs et al. | |
| 5,541,703 A | 7/1996 | Suzuka | |
| 5,587,843 A | 12/1996 | Taylor et al. | |
| 5,773,810 A | 6/1998 | Hussey et al. | |
| 5,801,770 A | 9/1998 | Paff et al. | |
| 5,825,559 A | 10/1998 | Johnson et al. | |
| 5,836,867 A * | 11/1998 | Speier et al. | 600/112 |
| 5,979,770 A | 11/1999 | Schlieffers | |
| 6,069,651 A * | 5/2000 | Tsuyuki et al. | 348/75 |
| 6,073,851 A | 6/2000 | Olmstead et al. | |
| 6,166,765 A * | 12/2000 | Toyofuku | 348/220.1 |
| 6,179,208 B1 | 1/2001 | Feng | |
| 6,292,221 B1 * | 9/2001 | Lichtman | 348/345 |
| 6,340,114 B1 | 1/2002 | Correa et al. | |
| 6,424,369 B1 * | 7/2002 | Adair et al. | 348/76 |
| 6,431,452 B2 | 8/2002 | Feng | |
| 6,449,430 B1 | 9/2002 | Tasaka et al. | |
| 6,784,875 B2 | 7/2003 | Siltex | |
| 6,692,431 B2 * | 2/2004 | Kazakevich | 600/178 |
| 6,832,729 B1 | 12/2004 | Perry et al. | |
| 6,845,915 B2 | 1/2005 | Krichever et al. | |
| 7,025,271 B2 | 4/2006 | Dvorkis et al. | |
| 7,073,715 B2 | 7/2006 | Patel et al. | |
| 7,126,101 B2 * | 10/2006 | Yamaguchi | 250/208.1 |
| 7,222,793 B2 | 5/2007 | Patel et al. | |
| 7,354,399 B2 * | 4/2008 | Strom et al. | 600/200 |
| 7,417,803 B2 * | 8/2008 | Costigan et al. | 359/694 |
| 7,549,582 B1 | 6/2009 | Nunnink | |
| 2002/0191309 A1 | 12/2002 | Taylor et al. | |
| 2006/0034596 A1 | 2/2006 | Yamazaki et al. | |
| 2006/0055819 A1 | 3/2006 | Pokrovsky et al. | |

OTHER PUBLICATIONS

Legend 510 Data Sheet, DVT Sensors (Cognex Corporation), 2005.
Plug n' Play Machine Vision with High-End Performance, Keyence CV-500 Series, Keyence Corporation, Cat No. CV501-KA-C, 1999.
Cognex Corporation, In-Sight, Installing In-Sight 5000 Series Vision Sensors, 2003.

\* cited by examiner

MANUALLY ADJUSTABLE RUGGEDIZED FOCUS MECHANISM

BACKGROUND OF THE INVENTION

The invention pertains to image acquisition and, more particularly, to image acquisition devices that can be manually adjusted and that are sealed to the elements, e.g., water, chemicals, dirt, dust.

Image acquisition refers to the capture of still or video images. It forms a basis for "machine vision," i.e., the computer processing of images, and is used in manufacturing and industry for robotic assembly, parts inspection, quality control, etc. It is also increasingly used in military and security, as well as commercial and residential, applications.

Image acquisition devices, or "cameras" as they are commonly called, optimally utilize adjustable focus lenses. These have an advantage over fixed-focus lenses in that they permit optics (e.g., lens "glass") to be set at optimal focal points for objects at varying distances, thus insuring sharpness of both close (or far) objects.

In traditional industrial and manufacturing image acquisition applications, cameras are used indoors (e.g., on factory floors) in controlled environments. As the range of image acquisition applications broadens, there is increasing need for cameras that can be used outdoors or in other less controlled situations, e.g., where there is dust, dirt, water, chemicals, and so forth.

To this end, ruggedized cameras are often protected from the environment by a protective cover and/or an enclosure. However, in order for an operator (e.g., plant worker, military/security personnel, home owner, etc.) to focus the cameras, the protective covers must be removed. Not only is this inconvenient, but it runs the risk of exposing the lens to potentially harmful factors. Moreover, such adjustment often requires the use of particular tools, which can be expensive and complicated to use.

Image acquisition devices with adjustable focus lenses routinely use motorized focus mechanisms and/or external locking features. The drawbacks of the former are that the motorized mechanisms are more complicated, expensive, and prone to failure, e.g., due to power loss, breakage, and so on. The drawbacks of the latter are that if an operator fails to set or release a lock, focussing may be substantially impaired. Moreover, setting and releasing the locks adds an additional step to operations.

An object of the invention is to provide improved image acquisition devices and methods.

A further object of the invention is provide such devices and methods as operate in rugged environments without exposing the lens.

A still further object of the invention is to provide such devices and methods as provide for focusing of the lens, e.g., without motorized mechanisms and/or the use of tools.

A still further object of the invention provide such devices and methods for locking of focus positions with improved focal accuracy and speed.

A still yet further objects of the invention provide such devices and methods as can be produced at low cost.

SUMMARY OF THE INVENTION

The foregoing are among the objects attained by the invention which provides, in some aspects, devices for image acquisition that use seals (e.g., O-rings) between concentrically disposed portions of an enclosure and an optics assembly (or sub-assemblies thereof) in order to protect image acquisition components from the surrounding environment (and vice versa) while, at the same time, providing adequate friction for both adjusting and locking focus.

Such devices include, in one aspect of the invention, an image capture medium (e.g., a CMOS sensor, CCD array, etc.) that is disposed within an enclosure and an optics assembly that is also disposed within that enclosure, rotatably. The optics assembly, which includes at least a lens, can have a cylindrical outer diameter along at least a portion of its length that is received within the enclosure along a length that has a corresponding cylindrical inner diameter. A first seal (e.g., an "O-ring") is disposed between, and in contact with, the optics assembly and the enclosure, e.g., along these corresponding lengths. That seal permits rotation (or direct translation, e.g., by pushing or pulling) of the optics assembly for purposes of focusing the lens, while preventing (or reducing a risk of) contamination from the environment (e.g., water, chemicals, dirt, dust, etc.) from entering into the enclosure and vice versa.

In a related aspect of the invention, the first seal permits at least temporary fixation of the optics assembly relative to the enclosure—and, thereby, at least temporary fixation of focus—as a result of a friction fit effected between it, the assembly and the enclosure.

In another aspect, the invention provides a device for image acquisition as described above in which the optics assembly includes a lens sub-assembly and a window sub-assembly. The lens sub-assembly includes the lens, while the window sub-assembly includes an optically transparent cover (e.g., a window) and, for example, a focusing ring. The cover/window protects the lens and other image acquisition components that are within the enclosure from the environment, while permitting passage of light (or other rays) comprising images to be captured. The focusing ring facilitates grasping the window sub-assembly (and, more generally, the optics assembly) for purposes of rotating the assembly relative to the enclosure and/or rotating the window sub-assembly relative to the lens sub-assembly—and thereby facilitates focusing the lens, e.g., on the CMOS, CCD or other capture medium.

In still other aspects of the invention, the lens sub-assembly is disposed within the window sub-assembly. In this regard, the lens sub-assembly can have a cylindrical outer diameter along at least a portion of its length that is received within the window sub-assembly along a length that has a corresponding cylindrical inner diameter. A second seal (again, for example, an "O-ring") is disposed between, and in contact with, the respective sub-assemblies, e.g., along these corresponding lengths. That seal prevents (or reduces a risk that) any contamination that might have entered the enclosure, e.g., in a region "behind" the optics assembly, from entering the optics assembly, e.g., in the region between the lens (or lens sub-subassembly) and the window (or window sub-assembly). This can be useful, for example, in preventing any water, dust, etc., that may have entered the enclosure from clouding the lens or window).

As a result of a friction fit, that seal also permits at least partial coupling of the lens and window sub-assemblies, e.g., so that rotation of the focus ring (particularly) and/or the window sub-assembly (generally) translates to the lens sub-assembly and, thereby, facilitates focusing the lens. Because that rotational friction can be overcome, at least in some aspects of the invention, the seal can prevent excess rotation of the focus ring (particularly) and/or the window sub-assembly (generally) from being translated to the lens and, thereby, for example, from stripping lens-mount threading.

In another aspect, the invention provides a device for image acquisition as described above in which the lens sub-assembly is coupled to the enclosure (or otherwise) such that rotation of that sub-assembly varies the distance between the lens and the CCD (or other image capture medium)—and, thereby, focuses images received by the lens on the CCD (or other image capture medium).

In related aspects of the invention, that coupling is provided via corresponding threading on the lens sub-assembly (or lens itself) and a mount in the enclosure. That threading can include sealing materials, such as silicone, rubber, etc. to prevent any contamination that might have entered the enclosure from reaching the lens and/or the CCD or (image capture medium).

In still further aspects of the invention, as the distance between the lens and the CCD (or other image capture medium) varies, e.g., on account of rotation of the focus ring (particularly) and/or the window sub-assembly (generally), one or both of the O-rings (or other seals) permits linear translation of (a) the optics assembly (and windows sub-assembly) relative to the enclosure and/or (b) the window sub-assembly relative to the lens sub-assembly.

In yet another aspect, the invention provides methods of focusing, e.g., a device for image acquisition as described above, by rotating the optics assembly in order to vary the distance between the lens and the CCD (or other image capture medium). In related aspects, the invention provides such methods in which such rotation is effected by rotating the focus ring (particularly) and/or the window sub-assembly (generally) and, thereby, rotating the lens sub-assembly, so as to linearly and rotationally translate the lens (or lens sub-assembly) along a thread run provided by a mount that is coupled to the enclosure. In further related aspects of the invention, first and second seals as discussed above provide selective rotational coupling of the sub-assemblies, while permitting one or both of them to translate linearly for focusing.

These and other aspects of the invention are evident in the drawings and in the detailed description that follows.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Figure 1:
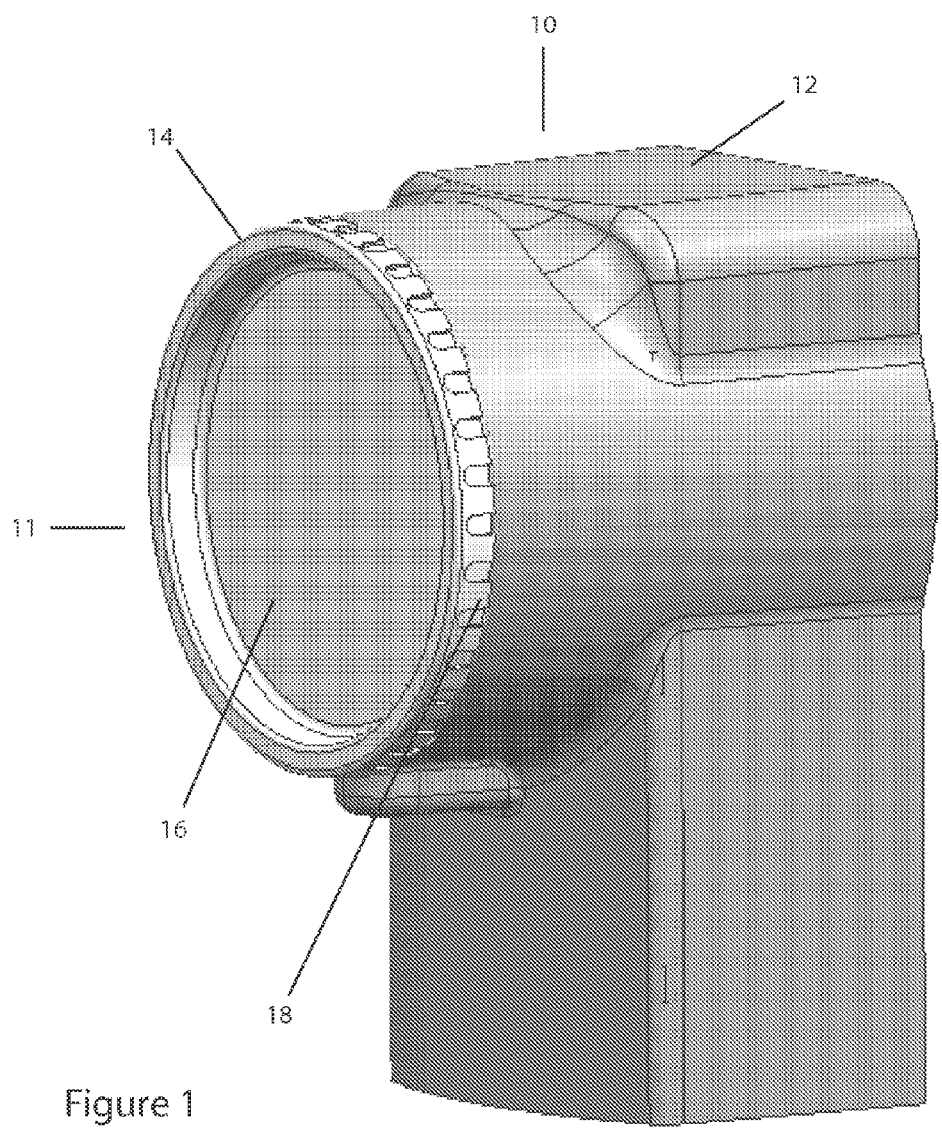
FIG. 1 depicts an image acquisition device according to one practice of the invention. The device includes an enclosure, which protects device components (e.g., a lens) from the surrounding environment, having a rotatable window sub-assembly that facilitates focusing of the lens component.

FIG. 1 depicts an image acquisition device 10 according to one practice of the invention. The device 10 includes a enclosure 12 having an optics assembly 11 rotatably disposed therein. The enclosure 12 houses components of the image acquisition device (e.g., a lens 32, an image capture medium, etc., as discussed below), protecting them from dust, dirt, water, moisture, and/or other elements of the surrounding environment (or more broadly, preventing an exchange or transfer of unwanted elements between the enclosure 12 and the environment). In the illustrated embodiment, enclosure 12, which may be "ruggedized," comprises ceramic, metal, plastic and/or other materials suitable for providing such protection under the device's 10 expected operating conditions.

Figure 2:
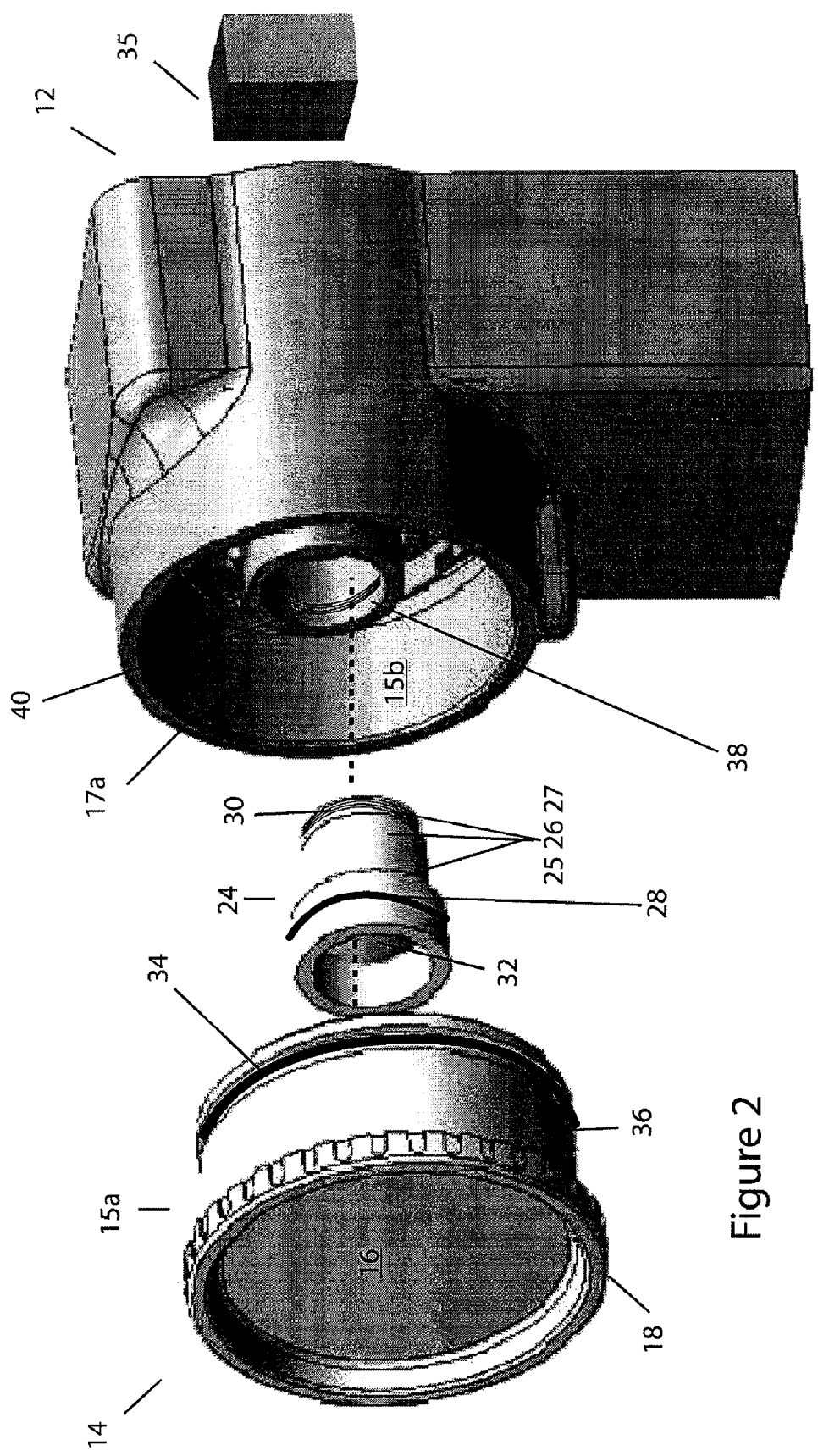
FIG. 2 depicts an exploded image acquisition device having a lens assembly, a window sub-assembly, and an enclosure, according to one practice of the invention.

FIG. 2 is an exploded view of the enclosure 12 and the optics assembly 11. The illustrated optics assembly 11 comprises a lens sub-assembly 24 that is coupled to a window sub-assembly 14 as discussed below. The window sub-assembly 14 is, in turn, rotatably coupled to the enclosure 12, also as shown. It has a cylindrical outer diameter along at least a portion 15a of its length that is received within the enclosure 12 along a length 15b that has a corresponding cylindrical inner diameter, all as shown. More generally, in the illustrated embodiment, the optics assembly 11 and the portion of the enclosure 12 in which it is received are generally of circular cross-section; though, in other embodiments they may be shaped otherwise consistent with the teachings hereof.

The window sub-assembly 14 includes an optically transparent cover 16, a focusing ring 18, and a first seal 34, all as shown. The cover or "window" 16 protects the lens 32 (as well, more generally, as the sub-assembly 24) and other image acquisition components (e.g., charge coupled device (CCD) or other capture medium) that are within the enclosure 12 from the environment, while at the same time permitting passage of light or other rays (e.g., infrared, X-ray, and so forth) intended for capture by the CCD (or other image capture medium). In the illustrated embodiment, cover 16 is comprised of plastic, glass, or other materials suitable to meet the above requirements in expected operating conditions. In some embodiments of the invention, the cover 16 itself comprises a lens, e.g., for providing additional (or the sole means of) focusing for the device 10.

The focusing ring 18 facilitates grasping the window sub-assembly 14 (and, more generally, the optics assembly 11) for purposes of rotating the assembly 11 relative to the enclosure 12 and/or rotating the window sub-assembly 14 relative to the lens sub-assembly 24, thereby facilitating focusing of an image, e.g., on the CCD or other capture medium. In the illustrated embodiment, the focusing ring 18 is knurled, though, in other embodiments, it may be textured otherwise.

With continued reference to FIG. 2, the first seal 34 seals sub-assembly 14 (and the optics assembly 11 generally) within enclosure 12 (e.g., by an interference fit, friction fit, or otherwise). The sealing function minimizes the risk of contaminants from the environment (e.g., water, chemicals, dirt, dust, etc.) entering into the enclosure 12, e.g., into a region 17a "behind" the optics assembly 11 and, thereby, adversely affecting operation of the lens 32, CCD, or other component of device 10. Similarly, the seal 34 also prevents any desirable gases, fluids, etc., from escaping the enclosure 12 in to the environment.

The seal 34 also concurrently permits rotation (e.g., via the focusing ring 18) of the window sub-assembly 14 for purposes of (a) focusing the lens 32, and (b) facilitating at least a temporary fixation of the optics assembly 11 relative to the enclosure 12, and, thereby, at least temporary fixation of a focus, e.g., as a result of a friction fit effected between it, the assembly 11 and the enclosure 12. Compared to prior art systems, this has the added benefit of providing increased focal accuracy by removing the possibility that an operator may fail to set and/or release separate fixing (e.g., locking) features. Moreover, the seal 34 reduces focus time by eliminating the requirement of setting and/or releasing separate fixing (e.g., locking) features of the type provided in prior at systems.

In the illustrated embodiment, the first seal 34 is disposed between the window sub-assembly 14 (and thus, the optics assembly 11) and enclosure 12, along an outer diameter 36 (or "barrel") of the sub-assembly 14, e.g., in the region denoted 15a. In the illustrated embodiment, the seal 34 comprises, e.g., an elastomeric O-ring. In other embodiments, it may be a different type of seal suitable for protectively sealing the optics assembly 11 to the enclosure 12, and fixing a lens focus position, under expected operating conditions.

Returning to FIG. 2, the lens sub-assembly 24 of the illustrated embodiment is generally cylindrically shaped—albeit, here, with portions 25-27 of varying outer diameter. The assembly 24 comprises a second seal 28, and threads 30. It also comprises at least one lens 32, configured as shown.

Lens 32 is of the conventional type used in the art to gather light or other rays comprising an image (e.g., still, video, or otherwise) for projection onto the capture medium. In the illustrated embodiment, lens 32 is an optical lens, e.g., an M12 lens, though in other embodiments it may be sized otherwise or configured for collecting other wavelengths.

The image capture medium 35 (shown schematically) captures an image focused onto it by lens 32. In the illustrated embodiment, the device 10 comprises one or more charge-coupled device (CCD) arrays, CMOS sensors, film, magnetic tape, or other medium suitable for capturing an image through the lens 32. The medium is disposed within a "back" portion of enclosure 12, though, in other embodiments it may be disposed elsewhere.

The second seal 28 facilitates protectively affixing (e.g., sealing) the lens sub-assembly 24 to the window sub-assembly 14, and at least temporarily fixing the lens 32, lens sub-assembly 24, and/or window sub-assembly 14, in one or more focus positions. The seal 28 prevents (or reduces a risk that) any contamination that might enter the enclosure 12, e.g., in a region "behind" the optics assembly, from entering the optics assembly 11, e.g., in the region between the lens 32 (or lens sub-assembly 24) and the window 18 (or window sub-assembly 14). This can be useful, for example, in preventing any water, dust, etc., that may have entered the enclosure 12 from clouding the lens 32 or window 18.

In the illustrated embodiment, such sealing and fixing of a focus is achieved by the seal 28 facilitating a fit (e.g., friction fit, interference fit, or otherwise) of the lens 32/lens sub-assembly 24 and the window sub-assembly 14, and/or a fit of the lens 32/lens sub-assembly 24 and the enclosure 12. As a result of the fit, that seal 28 facilitates at least partial coupling of the lens 32 and sub-assemblies 14, 24, e.g., so that rotation of the focus ring 18 (particularly) and/or the window sub-assembly 14 (generally) translates to the lens sub-assembly 24 and, thereby, facilitates focusing of the lens 32. Because that rotational friction can be overcome, the seal 28 also prevents excess rotation of the focus ring 18 (particularly) and/or the window sub-assembly 14 (generally) from being translated to the lens 32 and, thereby, for example, from stripping lens-mount threading 30, 40, discussed below. In the illustrated embodiment, the second seal 28 is an O-ring comprised of, e.g., plastic, rubber, or otherwise, disposed along diameter 25, as shown, though in other embodiments it may be disposed elsewhere in a manner suitable for providing protective sealing under expected operating conditions.

With continued reference to FIG. 2 and the lens sub-assembly 24, threads 30 engage opposing threads on a lens mount 38 (discussed below) to rotatably couple the lens sub-assembly 24 to the enclosure 12, thereby facilitating focusing of the lens 32. In the illustrated embodiment, threads 30 form a run on an outside surface of diameter 27, though, in other embodiments they may be disposed elsewhere (e.g., diameter 25, diameter 26, etc.). The threads 30 can further include sealing materials, such as silicone, rubber, etc., to prevent any contamination that might have entered the enclosure 12 from reaching the lens 32 and/or the CCD or (image capture medium).

The aforementioned lens sub-assembly 24 couples with the lens mount 38 in order to facilitate focusing of the lens 32. In the illustrated embodiment, the mount 38 is of a cylindrical shape, of the same material as the enclosure 12, of a size sufficient to hold the lens sub-assembly 24, and disposed on an inside surface of enclosure 12, as shown. Moreover, the mount 38 is sized to permit a full range of lens 32 adjustments (e.g., in view of thread 30 length) for the range of expected focal lengths with which the device 10 is expected to be used. Coupling of the lens mount 38 and lens sub-assembly 24 is achieved as threads 30, disposed on an outside diameter of lens sub-assembly 24, engage opposing threads 40 on an inside diameter of the lens mount 38. In other embodiments, mount 38 may be of a different material, size, and/or shape, suitable for coupling with the lens sub-assembly 24 under expected operating conditions. Moreover, other embodiments may include a lens sub-assembly 24 that is disposed on an outside diameter of mount 38, and/or coupling may be achieved by a means different from threading.

Figure 3:
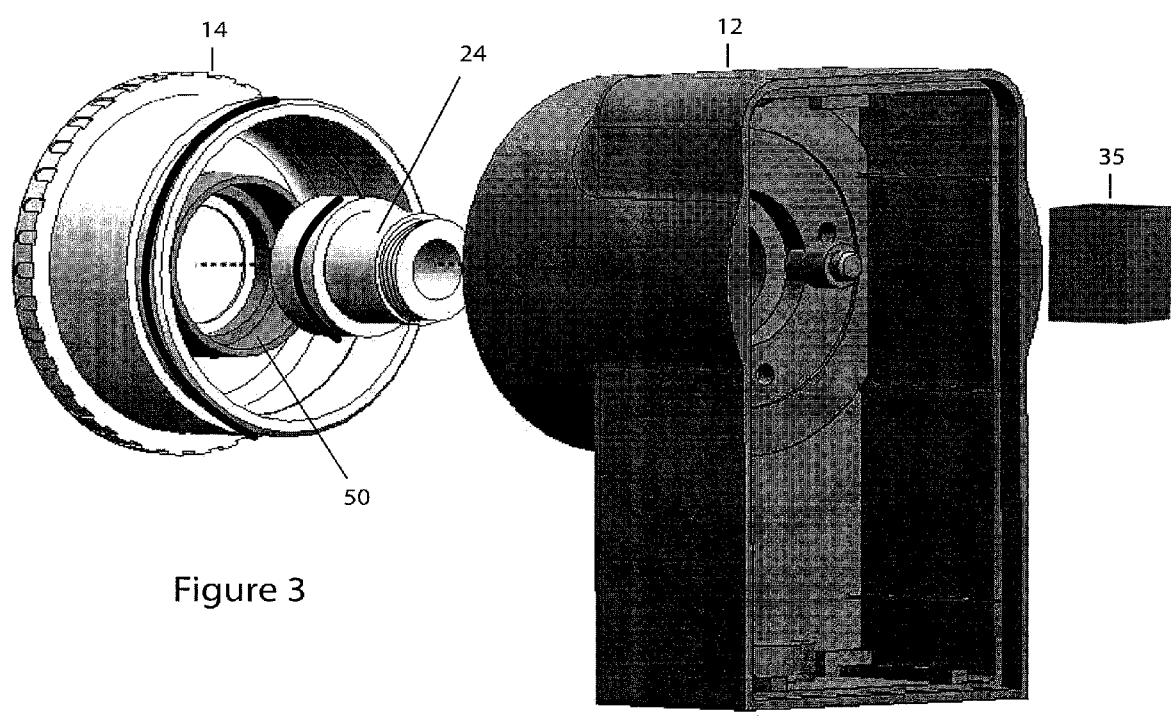
FIG. 3 depicts the exploded image acquisition device of FIG. 2 from another viewpoint, showing the internal structure of the window sub-assembly and enclosure.

FIG. 3 depicts an exploded view of image acquisition device 10, showing an internal structure of the enclosure 12 and window sub-assembly 14. In the illustrated embodiment, the enclosure 12 has a rear portion, as shown, that houses the image capture medium 35 (shown schematically) and other circuitry (not shown), though, in other embodiments they may be housed elsewhere.

The window sub-assembly 14 comprises an internal structure as shown, including a mount 50. The mount 50 couples with the lens sub-assembly 24 to facilitate affixing the lens sub-assembly 24 to the window sub-assembly 14. In the illustrated embodiment, the seal 28 forms a fit (e.g., an interference fit, or otherwise) with an inner diameter of mount 50, though, in other embodiments it may be affixed otherwise. The mount 50 is of a sufficient size and shape (e.g., cylindrical) as to hold the lens mount 24 within an inner diameter of the mount 50, and is disposed on an inside surface of the window sub-assembly 14, as shown. Moreover, the mount 50 is sized to permit a full range of lens 32 adjustments (e.g., in view of thread 30 length) for the range of expected focal lengths with which the device is expected to be used.

In operation, device 10 is placed into an environment (e.g., submerged underwater) for capturing images of that environment (and objects therein). An operator may focus an image on the image capture medium by manually rotating the focus ring 18 (particularly) and/or the window sub-assembly 14 (generally), which varies the distance between the lens 32 and the CCD (or other image capture medium), thereby, rotating the lens sub-assembly 24, so as to linearly and rotationally translate the lens 32 (or lens sub-assembly 24) along the thread run 40 provided by the mount 38 that is coupled to the enclosure 12. In further related aspects of the invention, first and second seals 34, 28 as discussed above provide selective rotational coupling of the sub-assemblies 14, 24, while permitting one or both of them to translate linearly for focusing.

Described above are devices and methods meeting the aforementioned objects, among others. Those skilled in the art will appreciate that the embodiments discussed and shown herein are merely examples of the invention and that other embodiments fall within the scope thereof. Thus, by way of non-limiting example, it will be appreciated that multiple O-rings (or other seals) may be used in place of, or in addition to, the rings shown in FIGS. 2-3 and discussed above. It will also be appreciated by way of non-limiting example, that such sealing may be provided integrally with the window subassembly, the lens sub-assembly, or enclosure, e.g., through overmolding or other manufacturing/assembly techniques. By way of still further example, it will be appreciated that, in further embodiments, focusing can be achieved other than by rotating the window sub-assembly. For example, it may be achieved by directly linearly translating that sub-assembly relative to the enclosure and/or lens sub-assembly (e.g., by pushing or pulling—rather than, or in addition to, rotating). In view thereof, what we claim is:

The invention claimed is:

1. An image acquisition device for use in an environment, comprising
   A. an enclosure,
   B. an image capture medium disposed within the enclosure,
   C. an optics assembly that is rotatably disposed within the enclosure, the optics assembly comprising a lens sub-assembly and a window sub-assembly, the lens sub-assembly that includes a lens and that is rotatably disposed within the window sub-assembly, the lens subassembly having a cylindrical outer diameter along at least a portion of its length that is received within the window sub-assembly along a length that has a corresponding cylindrical inner diameter,
   D. a first seal that is in contact with at least the optics assembly, the first seal permitting rotation of the optics assembly in order to effect focusing of an image received by the lens on the image capture medium-while, at the same time, preventing contamination of at least selected components of the environment into the enclosure or vice versa, and
   E. a second seal that is disposed between, and in contact with, the window sub-assembly and the lens sub-assembly along at least a portion of the aforesaid lengths thereof.

2. The device of claim 1, wherein the first seal permits at least temporary fixation of the lens or the optics assembly in one or more focus positions.

3. The device of claim 2, wherein the first seal provides such temporary fixation via a friction fit.

4. The device of claim 1, wherein the window sub-assembly has a cylindrical outer diameter along at least a portion of its length that is received within the enclosure along a length that has a corresponding cylindrical inner diameter.

5. The device of claim 4, wherein the first seal is disposed between, and in contact with, the window sub-assembly and the enclosure along at least a portion of the aforesaid lengths.

6. The device of claim 4, wherein the first seal permits rotation of the window sub-assembly for purposes of focusing the lens, while reducing a risk of one or more of (i) contamination from the environment from entering into the enclosure, and (ii) contamination from the enclosure from entering into the environment.

7. The device of claim 6, wherein the first seal is an O-ring.

8. The device of claim 6, wherein the first seal is integral with the window sub-assembly.

9. The device of claim 1, wherein the window sub-assembly includes an optically transparent cover.

10. The device of claim 9, wherein the optically transparent cover comprises a lens.

11. The device of claim 9 wherein the optically transparent cover permits any of optical or other rays intended for capture by the image capture medium to pass to the lens.

12. The device of claim 1, wherein the second seal comprises an O-ring.

13. The device of claim 1, wherein the second seal is integral with the lens sub-assembly.

14. The device of claim 1, wherein the second seal reduces a risk of contamination from the enclosure into the lens sub-assembly.

15. The device of claim 1, wherein the second seal permits at least partial rotational coupling of the lens sub-assembly and the window sub-assembly.

16. The device of claim 15, wherein the second seal permits at least partial rotational coupling of the lens sub-assembly and the window sub-assembly so that rotation of the window sub-assembly translates to the lens sub-assembly and, thereby, facilitates focusing the lens.

17. The device of claim 16, wherein the coupling is effected by a friction fit.

18. The device of claim 1, wherein the lens sub-assembly is coupled to the enclosure such that rotation of the lens sub-assembly varies the distance between the lens and the image capture medium.

19. The device of claim 18, wherein the coupling between the lens sub-assembly and the enclosure is effected by threading.

20. A method of focusing an image acquisition device of claim 1, comprising rotating the optics assembly in order to vary the between the lens and the image capture medium.

21. An image acquisition device for use in an environment, comprising
   A. an enclosure,
   B. an image capture medium disposed within the enclosure,
   C. a window sub-assembly that includes an optically transparent cover and that is rotatably disposed within the enclosure,
   D. a lens sub-assembly that includes a lens and that is disposed within the window sub-assembly,
   E. a first seal that is in contact with at least the window sub-assembly, the first seal permitting rotation of the window sub-assembly relative to the enclosure while, at the same time, preventing contamination of at least selected components of the environment into the enclosure,
   F. a second seal that is disposed between, and in contact with, the window sub-assembly and the lens sub-assembly along at least a portion of the aforesaid lengths thereof,
   G the lens sub-assembly being coupled to the enclosure such that rotation of the lens sub-assembly varies the distance between the lens and the image capture medium.

22. The device of claim 21, wherein the window sub-assembly has a cylindrical outer diameter along at least a portion of its length that is received within the enclosure along a length that has a corresponding cylindrical inner diameter.

23. The device of claim 21, wherein the lens sub-assembly has a cylindrical outer diameter along at least a portion of its length that is received within the window sub-assembly along a length that has a corresponding cylindrical inner diameter.

24. A method of focusing an image acquisition device of claim 21, comprising rotating the window sub-assembly in order to vary the distance between the lens and the image capture medium.

* * * * *